Figure 1:
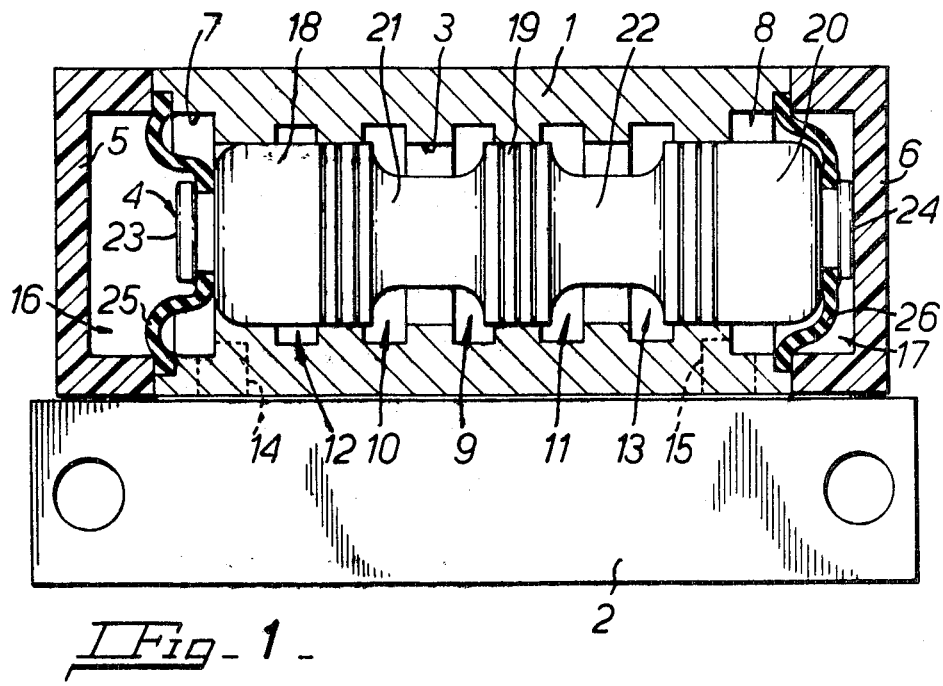

United States Patent

[11] 3,623,695

| [72] | Inventor | John W. Hislop |
| | | Owen Road, Wolverhampton, |
| | | Staffordshire, England |
| [21] | Appl. No. | 4,725 |
| [22] | Filed | Jan. 21, 1970 |
| [45] | Patented | Nov. 30, 1971 |
| [32] | Priority | Jan. 21, 1969 |
| [33] | | Great Britain |
| [31] | | 3277/69 |

[54] FLUID FLOW CONTROL VALVES
5 Claims, 2 Drawing Figs.

[52] U.S. Cl. ................................................. 251/75,
137/625.66, 267/161
[51] Int. Cl. .............................................. F16k 31/12,
F16k 11/07, F16f 1/32
[50] Field of Search ........................................ 251/75;
137/625.25, 625.26, 625.27, 625.48, 625.61,
625.63, 625.64, 625.66, 625.69

[56] References Cited
UNITED STATES PATENTS

| 2,070,421 | 2/1937 | Chisholm et al. ............ | 251/75 |
| 2,521,891 | 9/1950 | Beams ........................... | 251/75 |
| 2,561,405 | 7/1951 | O'Brien et al. ................ | 267/159 |
| 2,625,437 | 1/1953 | Huntington ................... | 251/75 X |
| 3,112,768 | 12/1963 | Thompson ..................... | 137/625.26 X |
| 3,218,935 | 11/1965 | York et al. .................... | 251/75 X |
| 3,504,849 | 4/1970 | Quinn et al. .................. | 251/75 X |

Primary Examiner—Henry T. Klinksiek
Attorney—Imirie & Smiley

ABSTRACT: A fluid flow control valve comprising a spool which is reciprocable axially between two alternative extreme positions each determined by abutment of the spool against a stop fixed in the valve, and at least one resilient diaphragm of which the central zone is anchored to and concentrically of the spool, the peripheral zone is anchored to and between the ends of the wall of a concentric chamber in the valve and the area exceeds the cross-sectional area of the chamber by an amount such that, when the spool is in either of its alternative extreme positions, the diaphragm portion between the said zone is deformed into a cup shape and resists axial displacement of the spool away from the stop.

INVENTOR

JOHN W HISLOP

BY

FLUID FLOW CONTROL VALVES

This invention relates to fluid-flow control valves of the kind comprising a spool which is a close-sliding fit within a ported body and is adapted to be reciprocated axially, either manually, pneumatically, hydraulically, mechanically or electromechanically between two alternative extreme positions, each determined by abutment of the spool against a stop fixed within the valve, so as to change or switch over the body ports which are in communication with one another.

Valves of the above kind suffer from the disadvantage that, when the spool has been driven to either of its extreme positions by an axially applied force and the force is removed or relieved, the spool is liable to be moved in the reverse direction by, for example, gravity or vibration, with the result that the interport communications established by the spool are throttled or reversed.

The principal object of the present invention is to provide simple and economical means having a long useful life, for preventing such inadvertent and undesirable axial spool movements.

In accordance with the said invention, the central zone of at least one resilient diaphragm is anchored to and concentrically of the spool of a valve of the kind referred to above, the peripheral zone of the diaphragm is anchored to and between the ends of the wall of a concentric chamber in the valve, and the area of the diaphragm exceeds the cross-sectional area of the chamber by an amount such that, when the spool end is in either of its alternative extreme positions, the diaphragm portion between the said zones is deformed into a cup shape and resists axial displacement of the spool away from the stop.

Figure 2:
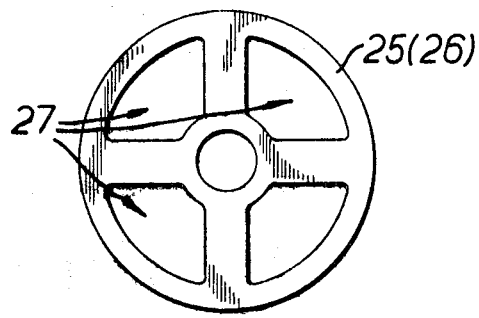

In order that the invention may be understood and carried into practice more readily, one typical embodiment thereof will now be described, by way of example, with reference to the accompanying drawing wherein:

FIG. 1 is an elevation, partly in section, of a spool valve adapted to control the operation of a double-acting pneumatic cylinder, and FIG. 2 is a plan of a flexible diaphragm adapted to be anchored to either end of the axially reciprocable spool of the valve.

The valve shown in FIG. 1 comprises a body 1 which is rectangular in cross section, is secured upon a base 2 and has a cylindrical, coaxial and coextensive bore 3, a spool 4 which is accommodated and is reciprocable axially within the bore, and two identical closure caps 5, 6, which are of the same cross-sectional configuration and dimensions as, and are secured, respectively, upon and coincide with the opposite ends of the body.

The body is formed with two identical recesses 7, 8 which are concentric to but of larger diameter than the bore, and open respectively to the opposite body ends, and with five identical annular grooves 9, 10, 11, 12 and 13 which open to and are pitched equidistantly apart axially of the bore and each of which is in permanent communication with a corresponding one of an equal number of ducts (not shown) extending through the base, through a corresponding one of an equal number of ports (also not shown) in the body.

The body is also formed with two additional ports 14, 15 which open respectively into the recesses 7, 8, and each of which is in permanent communication with a corresponding one of two additional ducts extending through the base.

The closure caps are formed respectively with circular recesses 16, 17 which are of the same diameter and axial dimension as and coincide with the recesses 7, 8 so that the recesses 7 and 16 provide one cylindrical chamber and the recesses 8 and 17 provide an identical cylindrical chamber within the valve.

The spool has three lands 18, 19 and 20 which are close-sliding fits within the bore and alternate, axially of the spool, with two identical necks 21, 22 having a smaller diameter than the bore so that an annular clearance is created around each neck between the latter and the grooved wall of the bore. Two identical and coaxial headed studs 23, 24 project respectively from the opposite ends of the spool and the central zone of a corresponding one of a pair of circular rubber or analogous resilient diaphragms, 25, 26 of which the peripheral zone is gripped and clamped between the adjacent end of the body 1 and the rim of the adjacent closure cap, encircles the shank of and is anchored to each of the studs.

The spool has an axial dimension equal to the sum of the axial dimensions of the bore and one of the chambers 7, 16 and 8, 17 and is reciprocable between alternative two extreme positions wherein, respectively, the stud 23 abuts the floor of the cap recess 16 and the stud 24 abuts the floor of the cap recess 17.

The area of each diaphragm exceeds the cross-sectional area of the chambers by an amount such that, when the spool is driven axially to either of its alternative extreme positions, the portion of each diaphragm between its anchored central and peripheral zones, is deformed, in the direction of spool travel, into a cup shape without tensioning the diaphragm material so that, due to the resilience of the said material, the deformed diaphragm portions exert on the spool, a resistance to reverse axial movement which is sufficient to prevent such movement under the action of gravity and/or vibration but is insufficient to prevent the spool being driven by an axially applied force, to the other of its extreme positions, and the diaphragms being deformed in the opposite direction. Preferably the difference between the area of the diaphragms and the cross-sectional area of the chambers is such that, when the spool is in either of its alternative extreme positions, the material of the deformed, cup-shaped portions is under a degree of compressive stress so that the said portions urge the head of the corresponding stud into abutment with the floor of the recess in the corresponding closure cap, thereby increasing the resistance of the spool to reverse axial movement.

The spool is adapted to be driven between its alternative extreme positions by supplying compressed air, or other pressurized fluid, to the appropriate chamber 7, 16 or 8, 17 through the corresponding body port 14 or 15, while exhausting spent air or fluid from the other chamber, again through the corresponding body port and, as shown in FIG. 2, apertures 27 are formed in the deformable diaphragm portions so that the fluid being supplied to, and the fluid to be exhausted from, the chambers may flow freely through the said portions.

To enable the valve to control the operation of a double-acting pneumatic cylinder, the central groove 9 is connected to a supply of compressed air and the intermediate grooves 10, 11 are connected respectively into the opposite ends of the cylinder, through the corresponding body ports and base ducts, and the end grooves 12, 13 are both in communication with the atmosphere, again through the corresponding body ports and base ducts. Hence when, for example, the spool is driven to the extreme position shown in FIG. 1, the annular clearance around the neck 21 establishes communication between the grooves 9 and 10 so that compressed air flows to one end of the cylinder, and the annular clearance around the neck 22 establishes communication between the grooves 11 and 13 so that air is exhausted from the opposite end of the cylinder. However, when the spool is driven to its alternative extreme position, the clearance around the neck 21 establishes communication between the grooves 10 and 12, and the clearance around the neck 22 establishes communication between the grooves 9 and 11 with the result that air previously supplied to the one end of the cylinder is exhausted and compressed air is supplied to the previously exhausted cylinder end.

It is to be understood that although the invention has been described with specific reference to a spool valve which is operable by a pressurized fluid for controlling the operation of a double-acting pneumatic cylinder, it may be applied to any fluid-flow control valve having a spool which is reciprocable axially between two alternative extreme positions, irrespectively of the means provided for driving the spool between the said positions and/or the intended purpose to be served by the valve-controlled fluid flow.

I claim:

1. A fluid-flow control valve comprising a body having a longitudinal bore and at least one chamber which is coaxial to but of greater cross-sectional area than the bore, a one-piece spool which is reciprocable axially within the bore between two alternative extreme positions each determined by abutment of the spool against a corresponding one of two fixed stops in the opposite ends of the body, and a nonmetallic, resilient diaphragm accommodated within the chamber, the periphery of a hole in the central zone of the diaphragm being engaged and anchored in a circumferential groove in the spool, the peripheral zone of the diaphragm being engaged and anchored in an internal circumferential groove in and between the ends of the wall of the chamber, and the area of the diaphragm being in excess of the cross-sectional area of the chamber by an amount such that, when the spool is in either of the said alternative extreme positions, the diaphragm portion between the said zones is deformed into a cup shape and is under a degree of compressive stress so that it urges the spool into abutment with the corresponding stop and resists axial displacement of the spool away from the stop.

2. A fluid-flow control valve as claimed in claim 1 wherein the portion of the diaphragm between its central and peripheral zones is apertured to enable fluid to flow freely therethrough.

3. A fluid-flow control valve comprising a body having two identical chambers and a longitudinal bore which is coaxial to, extends between, opens into and is of smaller cross-sectional area than said chambers, a one-piece spool reciprocable axially within the bore between two alternative extreme positions each determined by abutment of the head of a corresponding one of two identical studs projecting respectively and coaxially from the opposite ends of the spool against the adjacent one of the remote end walls of the chambers, and two identical, nonmetallic and resilient diaphragms each accommodated in a corresponding one of the chambers, said studs each including an abutment head and a shank of smaller diameter and defining a circumferential groove between said head and the spool end, each said diaphragm having a centrally disposed hole, the rim of which is anchored in said circumferential groove in surrounding relation to said shank, the peripheral zone of each diaphragm being engaged and anchored in an internal circumferential groove in and between the ends of the wall of the corresponding chamber, and the area of the diaphragms being greater than the cross-sectional area of the chambers by an amount such that, when the spool is in either of the said alternative extreme positions, the portions of the diaphragms between their respective central and peripheral zones, are deformed into cup shapes and are under a degree of compressional stress so that the said deformed portions urge the head of a corresponding one of the studs into abutment with the adjacent chamber end wall and resist axial movement of the spool away from the said end wall.

4. A fluid-flow control valve as claimed in claim 3 wherein each of the two chambers is formed by a recess in a corresponding one of the opposite ends of the valve body and is coaxial to and of a greater cross-sectional area than the adjacent end of the spool, and by a recess, having the same dimensions as and coinciding with the said body recess, in a closure cap secured upon the said corresponding body end, and the peripheral zone of each diaphragm is clamped between the said body end and the closure cap secured thereto.

5. A fluid-flow control valve as claimed in claim 3 wherein the portion of each diaphragm between its central and peripheral zones, is apertured to enable fluid to flow freely therethrough.

* * * * *